United States Patent [19]

Maslak et al.

[11] Patent Number: 4,550,607
[45] Date of Patent: Nov. 5, 1985

[54] PHASED ARRAY ACOUSTIC IMAGING SYSTEM

[75] Inventors: Samuel H. Maslak; John N. Wright, both of Palo Alto, Calif.

[73] Assignee: Acuson, Mountain View, Calif.

[21] Appl. No.: 607,670

[22] Filed: May 7, 1984

[51] Int. Cl.$^4$ ............................................. G01N 29/00
[52] U.S. Cl. ..................................................... 73/626
[58] Field of Search ......................... 73/626, 625, 628; 367/103, 105, 119, 122, 124; 128/660

[56] References Cited

U.S. PATENT DOCUMENTS

| | | | |
|---|---|---|---|
| 4,005,382 | 1/1977 | Beaver | 73/626 |
| 4,116,229 | 9/1978 | Pering | 367/103 |
| 4,140,622 | 2/1979 | Maslak | 73/626 |
| 4,484,477 | 11/1984 | Buxton | 73/626 |

*Primary Examiner*—Stephen A. Kreitman
*Attorney, Agent, or Firm*—James F. Mitchell

[57] ABSTRACT

A phased array acoustic imaging system including an array of electromechanical transducers, a dedicated signal processing channel for each transducer and electronic control and delay circuits for them, transmits to and receives ultrasonic energy from a body in a controlled, steered and focused fashion. The electronic delay circuits use a unique cyclically symmetrical arrangement of identical delay cells, each with an electronically variable delay element and each dedicated to a receive signal derived from at least one transducer, to form a summing delay line. The individual delay cells are switched under microprocessor control for efficient combined linear-sector scanning or linear or sector scanning alone. The system includes means to achieve dynamic focusing and dynamic apodization in conjunction with the delay cell architecture.

19 Claims, 10 Drawing Figures

FIG_5A.

FIG_5B.

PHASED ARRAY ACOUSTIC IMAGING SYSTEM

BACKGROUND OF THE INVENTION

Recent improvements in the use of ultrasonic energy to illuminate the internal organs of the human body have included "realtime" imaging, which enables visualization of the motion of the organs, and "gray-scale" imaging, which gives diagnostic information concerning the texture of the soft tissue in the body. More recently, ultrasonic imaging using arrays of transducers with appropriate control electronics has proven successful because of transducer reliability, flexibility and capability for steering and focusing ultrasonic energy, and has improved resolution over a certain depth of field, particularly near the transducer.

Improvement beyond the present state of the art requires larger transducer arrays with more elements, but this requires correspondingly more circuitry. In order to produce such systems economically, innovations must be made in system architecture to permit flexible system operation which makes extensive use of symmetry to minimize dedicated hardware without sacrificing performance, consistent with high resolution imaging.

An example of previous array technology is described in U.S. Pat. No. 4,140,022 granted Feb. 20, 1979 to Samuel H. Maslak and assigned to Hewlett-Packard Company, where extensive use of tap selectors is illustrated. In the there-described system, the number of analog switches required for tap selection depends upon the product of the number of input signals, which is equal to or proportional to the number of active transducer elements, and the number of taps in the summing delay line configuration. In order to improve the performance of such a system, by doubling the number of transducer elements, for example, the number of analog switches must increase by a factor of four to accommodate the longer delay line needed for the corresponding improvement in performance. These analog switches contribute substantially to system cost because they should be low-noise, broad-bandwidth components. It is, therefore, desirable to eliminate the need for tap selection completely. Furthermore, the foregoing patented system provides a sector scan but does not provide for linear scanning.

Another example of the prior art, U.S. Pat. No. 4,005,382 granted on Jan. 25, 1977 to William L. Beaver and assigned to Varian Associates, does avoid tap selection. But the described system is unable to provide the non-monotonic delay profiles required to achieve significant focusing of the ultrasonic wave at angles at or near the normal to the transducer. That patented architecture requires "zero delay" electrical connections among the outputs of adjacent delay elements, which creates severe technological difficulties in a high resolution imaging system with many simultaneously active transducer elements. That patented architecture also lacks the cyclical symmetry needed for a linear scanning format, wherein sequential acoustic lines are activated, each normal to the transducer but displaced by an amount along the transducer array which might be equal to the transducer element-to-element spacing.

SUMMARY OF THE INVENTION

The principal object of this invention is to provide an acoustic imaging system with a very flexible architecture which can accommodate both a linear and a sector scanning format for an array of a very large number of active electromechanical transducer elements, such as 128, in an economical fashion. The basis of this architecture is a delay cell which contains an electronically variable delay element and which is dedicated to a receive signal derived from at least one transducer. The architecture comprises a cyclically continuous structure, so that each delay cell, including the end cells, have an adjacent cell to the right and to the left. The individual delay cells are configured to achieve a desired delay profile for each scan line under digital control.

Each delay cell contains an electronically variable delay element, control electronics, summers, and solid state switches to sum selectively (1) the derived transducer receive signal with other signals input to the delay cell including (2) the output of the previous delay cell, and/or (3) the output of the next delay cell, and/or (4) the output from one arbitrary other delay cell. The output of each delay cell may be selectively routed to one of several different places, i.e. (1) to the input of the previous delay cell, or (2) to the input of the next delay cell, or it may be "out-selected" for (3) video processing or (4) for "in-selection" to the input of one selectable other delay cell.

Such an architecture provides means to structure a summing delay line so as to achieve a non-monotonic delay profile which is necessary for well-focused acoustic lines especially when steered to within a few degrees, such as up to 15° or so, of normal to the face of the transducer in the sector scanning mode. In the linear scanning mode, such architecture provides means to generate an acoustic focus, upon reception, along parallel acoustic lines, all of which are at a fixed angle which might be normal to the transducer array, in such a way that even the acoustic lines centered near the last transducer of the array utilizes the entire summing delay line. This capability results from the cyclic symmetry of the delay cell architecture, and avoids the need to double the number of delay cells in order to achieve comparable performance.

It is another object of this invention in combination with the delay cell architecture to include heterodyning or mixing of each transducer receive signal with one of a plurality of individually phased clocks prior to delay so as to achieve phase coherence with one or more other transducer receive signals processed in a similar way. This allows the set of delay cells to be coarsely quantized.

It also is an object of this invention to sum such heterodyned and phase adjusted transducer receive signals in phase coherent triplets, quadruples or, in the preferred embodiment, in phase coherent pairs, prior to connection to delay. This achieves a substantial reduction in the number of delay cells required in a particular system.

Another object of this invention is to provide means to dynamically vary the clock phase mixed with each receive signal at various times during reception in order to maintain phase coherence of all active receive channels to within some predetermined amount which might be less than 45°.

It is also an object of this invention to dynamically update the amplitude weighting of the receive signal from each transducer, including a weighting of zero, at various times throughout reception in order to improve focusing and sidelobe performance.

One other object of this invention is to include static amplitude weighting means, including a weighting of zero, for the linear scanning mode to generate acoustic scan lines up to and including one centered on the last transducer element in the array.

Another object of this invention is to maintain an approximately constant ratio of focal range to size of active aperture throughout at least a portion of the field of view.

It is also an object of this invention to provide an imaging system that operates in a sector mode only, or in a linear mode only, or in a combined linear/sector mode.

Other objects and advantages will be apparent from a consideration of the following description of a preferred embodiment of the invention in connection with the accompanying drawings.

BRIEF DESCRIPTION OF THE DRAWINGS

FIG. 2b is a schematic diagram of the delay cell arrangement for the delay profile shown in FIG. 2a;

FIG. 3b is a schematic diagram of the delay cell arrangement for the delay profile shown in FIG. 3a;

FIG. 3c graphically depicts the delay profile for a scan line normal to the array at one end of the pairs of transducers of FIG. 3a;

FIG. 4b is a schematic diagram of the delay cell arrangement for the delay profile shown in FIG. 4a;

FIG. 5b is a schematic diagram of the delay cell arrangement for the profile shown in FIG. 5a.

DESCRIPTION OF THE PREFERRED EMBODIMENT

Figure 1:
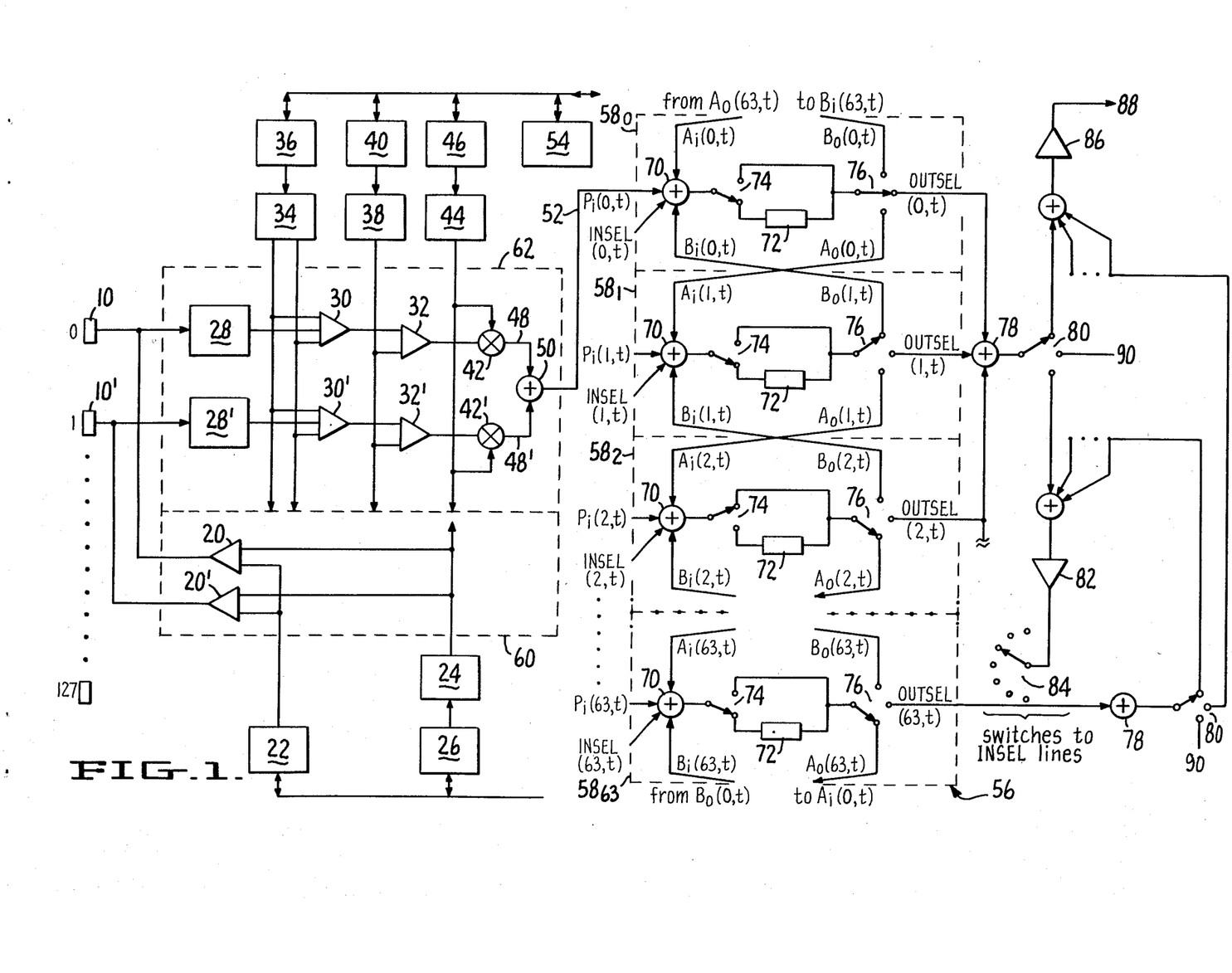
FIG. 1 is a schematic block diagram of the system architecture.

FIG. 1 schematically illustrates the system architecture in a preferred embodiment that employs phase coherent or phased pairs of transducer signals. For each acoustic scan line the electromechanical transducer array launches an acoustic pressure wave which is electronically steered and focused. Transducers 10, 10' of one phased pair are activated by a drive pulse from their associated transmit drivers 20,20' which have been amplitude weighted by values stored in transmit apodization memory 22. The radial direction of a transmitted acoustic pressure wave from the array for sector scanning is determined by the relative times at which each transducer of the array is pulsed.

A signal which has appropriate time delay is generated in the transmit delay cell 24. These time delay values, one for each active transducer element, which cause the transmitted acoustic beam to be steered and focused, are stored in transmit delay memory 26. The time delayed signal generated in each transmit delay cell is supplied to each transmit driver 20, which then activates each transducer element 10.

Transducers 10,10' are two adjacent ones of a planar array of one hundred twenty-eight identical electromechanical transducers, for example numbered 0 through 127 as shown.

At the completion of transmission of an acoustic wave each transducer 0 through 127, such as phased pair 10,10' begins to receive acoustic echos from specular and Rayleigh reflectors in the body. Each transducer converts the received acoustic echo into an electric receive signal which is processed in a separate receive channel dedicated to each transducer including, for the phased pair 10,10', protection circuit 28,28' to isolate the channel from transmit pulses, a variable gain amplifier 30,30' and a receive apodization amplifier 32,32' which amplitude weights each receive signal to values stored in receive apodization memory 40. Scanner gain driver 34 in accord with values stored in gain control memory 36 supplies dynamically up-dated bias and gain signals to variable gain amplifier 30,30'. Amplitude weighting is independently selected for each channel by receive apodizers 38 connected to apodizer amplifiers 32,32' in accord with values stored in receive apodization memory 40. The weighting may be dynamically changed during reception.

The receive apodizer amplifier output, which has most of its energy near its associated transducer center frequency, may be mixed in mixer 42,42' with one of a plurality of individually phased clock signals, such as $\cos(\omega_L o t + \Omega_0)$ and $\cos(\omega_L o t + \Omega_1)$ generated from a local reference oscillator by mixer clock generator 44 in accord with values stored in phase control memory 46. The particular clock phase angle is selected so that output 48 of mixer 42 has phase coherence with the output 48' of mixer 42' in the adjacent channel which is dedicated to transducer 10'. The outputs of mixers 42,42' being phase coherent to within reasonable accuracy, such as 45° or less, are summed in summing amplifier 50, creating a phased intermediate frequency signal 52 such as $P_i(0,t)$ for the first phased pair of transducers 10,10' (transducers 0,1) up to $P_i(63,t)$ for the last phased pair of transducers (transducers 126,127) in the array. If the individual receive channels are not grouped, such as in phased pairs, $P_i(0,t)$ may be simply the mixer output 48 from a single non-grouped receive channel.

The several memories are accessed and values updated dynamically by digital control means 54 which may include a microprocessor. The dynamic phase-shifting signal processing in a dedicated channel for each transducer is of the type more fully described in U.S. Pat. No. 4,140,022. However, instead of using the there-described tap selector and tapped master delay line, the present invention constructs a summing delay line 56 from a set of symmetrical delay cells 58, one for each phased intermediate frequency signal, such as 52, derived from a phased pair or other grouping of transducers in their corresponding receive signal processing channels. The phased intermediate frequency signals may also be derived from phase coherent transducer triplets or quadruples in order to allow the delay cells to be more coarsely quantized and to further reduce the number of delay cells necessary for a particular system. Alternatively, the phased intermediate frequency signals may be derived from phase coherent transducer singlets to allow more finely quantized delay cells at the expense of an increased number of delay cells.

Each delay cell 58 includes an input summing means such as summing amplifier 70 for adding phased intermediate frequency signal 52, $P_i(0,t)$, and any combination of three other input signals. Each delay cell 58 also has a delay element 72 which may have one or more selectable delays. In the described embodiment, there are two choices, no delay other than the normal electronic delay and a preselected finite delay, such as 230 ns, depending upon the position of electronic delay switch means 74.

The other delay cell inputs to summing amplifier 70 of delay cell $58_0$, in addition to (1) the phased intermediate frequency signal 52, $P_i(0,t)$, include (2) input $A_i(0,t)$ from the output of the previous delay cell $58_{63}$ in the summing delay line 56; (3) input $B_i(0,t)$ from the output of the next delay cell $58_1$; and (4) an inselected delay cell output, INSEL(0,t), which can come from the output of a selected delay cell. As shown in FIG. 1 for delay cell $58_0$ the previous delay cell $58_{63}$ is physically at the other end of the delay line 56, but electrically it is adjacent.

Each delay cell 58 has three selectable output paths depending upon the position of electronic delay cell output switch means 76. The selectable outputs of delay cell $58_0$ are $A_o(0,t)$, $B_o(0,t)$ and OUTSEL(0,t). As shown in FIG. 1, $B_o(0,t)$ and $A_o(0,t)$ go, respectively, to the inputs of the previous $58_{63}$ and the next $58_1$, delay cell. OUTSEL(0,t) enables the output of the delay cell to be routed to an associated outselect summing amplifier 78 where it may then be routed by a corresponding electronic distribution switch 80 to the inselect summing amplifier 82 and inselect switch means 84 or, when delay processing is complete, to the system intermediate frequency summing point at IF summing amplifier 86 for final video detection, other processing and display at 88. The associated outselect summing amplifier 78 output also may be decoupled from the signal path at 90.

In the preferred embodiment, eight outselect summing amplifiers 78 are employed. The OUTSEL outputs of eight adjacent delay cells are connected to the input of one outselect summing amplifier 78. The output of each outselect summing amplifier is independently routed by its associated distribution switch 80, to one of (1) the IF summing amplifier 86 (2) the INSELECT summing amplifier 82, or (3) is decoupled from the signal path at 90.

As the several intermediate frequency signals $P_i(0,t)$ through $P_i(63,t)$, such as 52, enter the delay line 56, they add to the intermediate frequency signals inserted from earlier delay cells in the sequence so that all the frequencies combine at the summing point, IF summing amplifier 86, in overlapped relationship with substantial phase coherence. The appropriate frequency band of the IF summing amplifier 86 output signal is selected by a filter in video detection means 88 and then processed for cathode ray tube or other display.

There is cyclical symmetry at the ends of the summing delay line 56. Input $A_i(0,t)$ of the first summing amplifier 70 comes from the output $A_o(63,t)$ of last delay cell $58_{63}$. Also, input $B_i(63,t)$ of the last delay cell $58_{63}$ comes from the output $B_o(0,t)$ of the first delay cell $58_0$. In effect, the delay line is completely circular in its architecture. This symmetry greatly simplifies the design by enabling the same data which is used to control the signal flow to be reused on a great number of different acoustic scan lines by merely rotating the data by means of digital control means 54.

The summing delay line 56 configuration, under several representative conditions, is illustrated graphically in FIGS. 2a, 3a, 3c, 4a and 5a. Each graphically shows a particular delay profile, where the vertical axis corresponds to relative delay and the horizontal axis corresponds to phased pairs of transducers such as 10,10'. The delay profile should properly be shown in quantized delay units, but for the sake of clarity, quantization effects have been ignored. In FIGS. 2b, 3b, 4b and 5b the corresponding summing delay line schematic configurations are shown. In these figures, each delay cell 58 is indicated by input summing means equivalent to summing amplifier 70 of FIG. 1 with the mixed intermediate frequency signal from one phased pair, such as 52, typically added with the output of an adjacent delay cell.

Figure 2A:
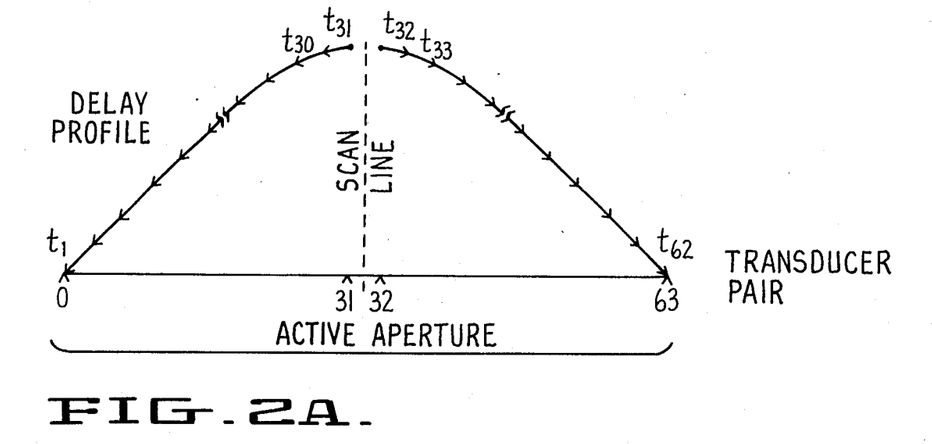
FIG. 2a graphically depicts the delay profile for a scan line normal to a planar transducer array at the center of the array.
Figure 2B:
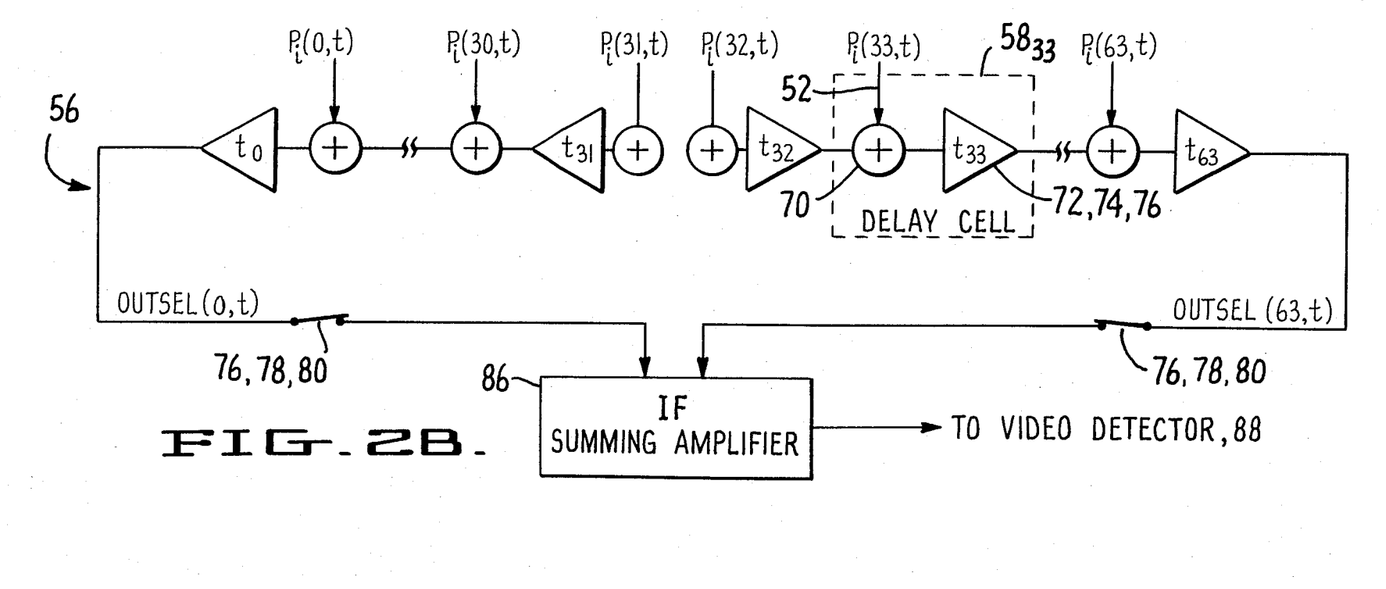

In particular, FIG. 2a illustrates a delay profile required for a scan line in the center of the array and normal to it originating between transducer phased pairs 31 and 32. FIG. 2b illustrates the configuration of the summing delay line 56 which implements the delay profile shown in FIG. 2a. The phased intermediate frequency signals $P_i(31,t)$ and $P_i(32,t)$ supply the input summing means 70 in the center delay cells $58_{31}$ and $58_{32}$. Signals to the left, including $P_i(31,t)$ to $P_i(0,t)$ are steered leftwards in the delay line, successively adding delay in the series connected delay cells, whereas signals to the right, including $P_i(32,t)$ to $P_i(63,t)$ are steered in the opposite direction. In this example, the entire aperture is utilized.

Delay cell output switch means 76 in end delay cell $58_0$ routes summed and delayed signal OUTSEL(0,t) to associated summing amplifier 78. So also does switch 76 in end delay cell $58_{63}$ route OUTSEL(63,t) to its associated summing amplifier 78. Both signals OUTSEL(0,t) and OUTSEL(6,t) then connect via associated distribution switches 80 to the summing point at IF summing amplifier 86 in time-overlapped relationship with substantial phase coherence.

Figure 3A:
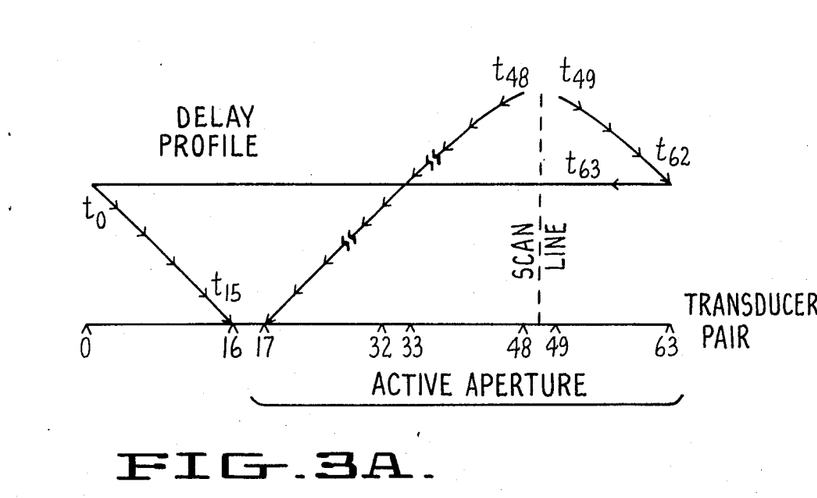
FIG. 3a graphically depicts the delay profile for a scan line normal to a planar transducer array centered between a pair of transducers 48,49 of the array.
Figure 3B:
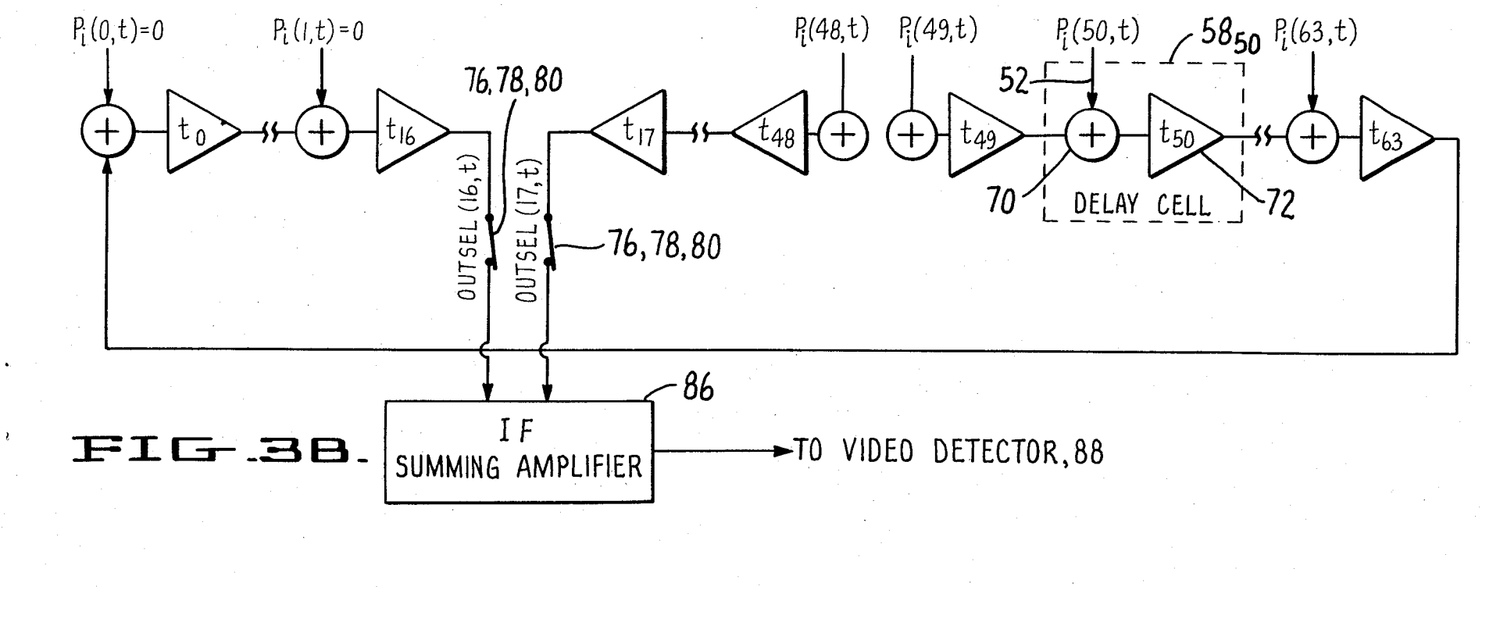

A linear scanning format with an active scan line normal to the array between transducer phased pairs 48 and 49 is shown in FIG. 3a. As described above, transducer phased pairs equal to or less than pair 48 steer to the left and pairs greater than 48 steer to the right. In the delay line configuration shown, each phased intermediate signal from $P_i(17,t)$ to $P_i(48,t)$ has successively more delay. $P_i(17,t)$ requires no additional delay, so the output of delay cell $58_{17}$ is routed by switches 76,78,80 to the IF summing amplifier 86. On the other side of the array, signals $P_i(49,t)$ to $P_i(63,t)$ are steered to the right and, in fact, $P_i(63,t)$ is also steered to the "right" by means of the cyclic symmetry described earlier, which connects it to the input summing amplifier 70 of delay cell $58_0$ to provide the additional delay of cells $58_0$ to $58_{16}$ as shown in FIG. 3b. Phased intermediate frequency signals $P_i(0,t)$ to $P_i(16,t)$ are turned off by receive aperture control means, such as apodizer amplifiers 32, in accord with apodizer 38 and apodization memory 40 of FIG. 1 and the active aperture consists only of phased pairs 17 through 63.

Figure 3C:
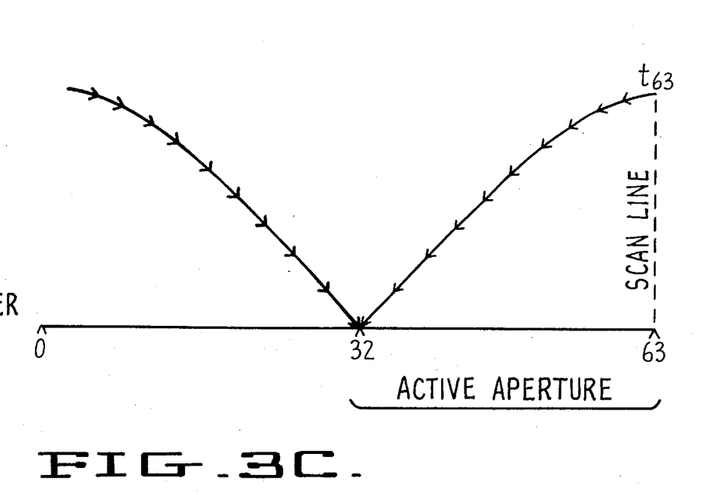

This static aperture control can be used to de-activate successive phased pairs while simultaneously shifting the delay profile to the right in this cyclic fashion in order to successively translate scan lines down the array, consistent with a linear scanning format. In the limiting case, the last scan line is placed over the last element in the array. In this case, as shown in FIG. 3c, half of the array is active. Delay cell $58_{32}$ is outselected to IF summing amplifier 86 and the phased intermediate frequency signals $P_i(0,t)$ to $P_i(31,t)$ are apodized off.

Figure 4A:
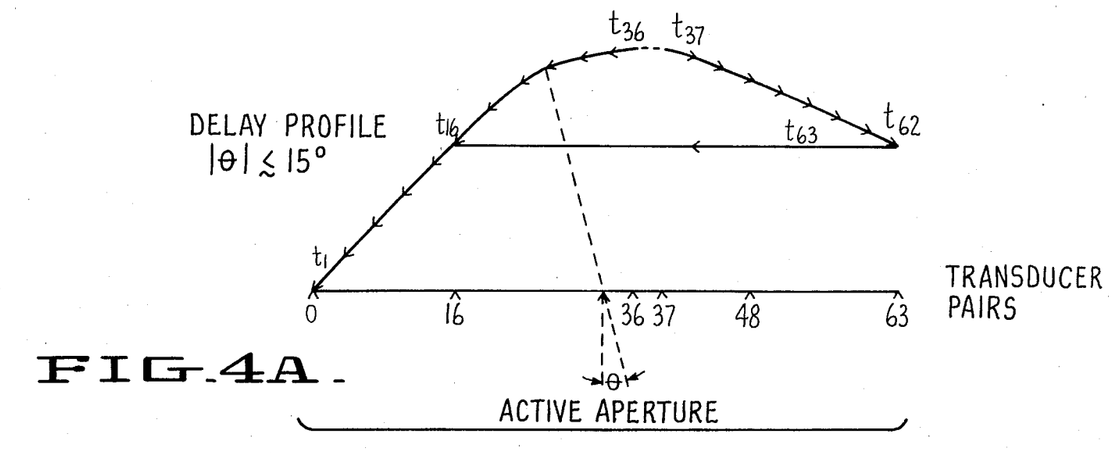
FIG. 4a graphically depicts the delay profile for a scan line where the steering angle ranges from zero to about 15° from normal to a planar transducer array.
Figure 4B:
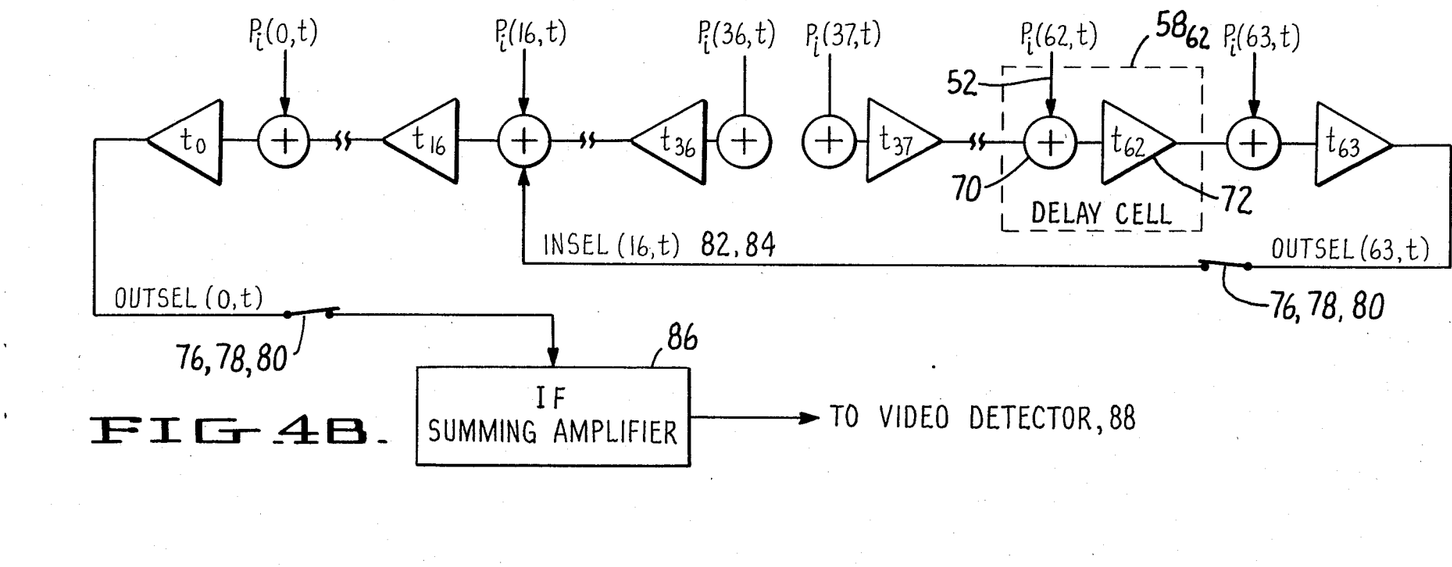

FIG. 4a illustrates delay profiles required in the sector scanning mode for steering angles $\theta$ which are between zero and 15° or so. This is a non-monotonic delay profile with no particular symmetry. In the example shown, the maximum delay is assumed to be between transducer phased pairs 36 and 37. For phased pairs less than or equal to 36, the delay path progresses in the usual way to the left. The output of delay cell $58_0$ is routed to the IF summing amplifier 86. The delay required for transducer pairs 37 to 63 is obtained by steering phased intermediate frequency signals $P_i(37,t)$ to $P_i(63,t)$ rightward through their respective delay cells. The output of pair 63 is routed to the inselect line of delay cell $58_{16}$ in order to use the required additional delay provided by delay cells $58_{16}$ to $58_0$. The output of delay cell $58_0$ is routed to the IF summing amplifier 86.

Figure 5A:
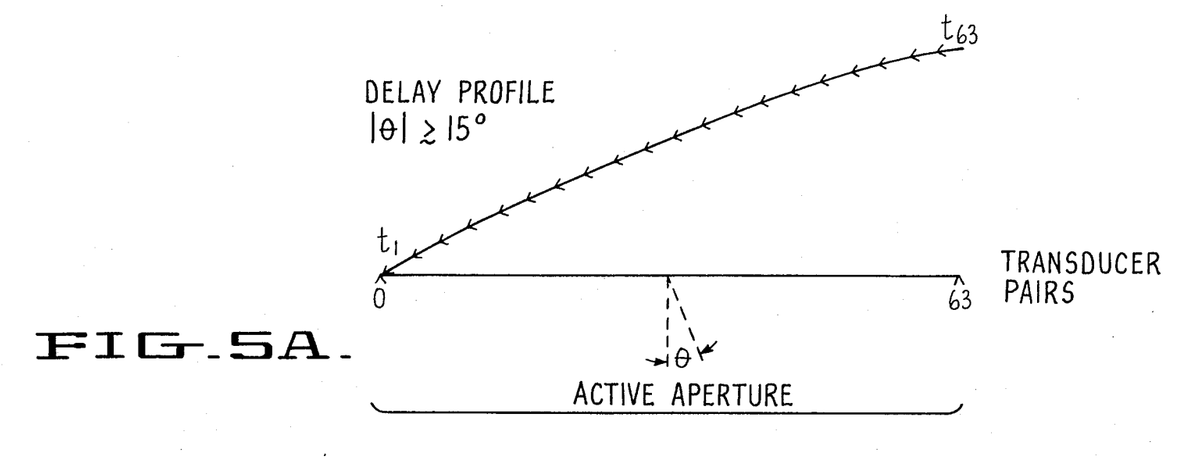
FIG. 5a graphically depicts the delay profile for a scan line where the steering angle is greater than about 15° from normal to a planar transducer array.
Figure 5B:
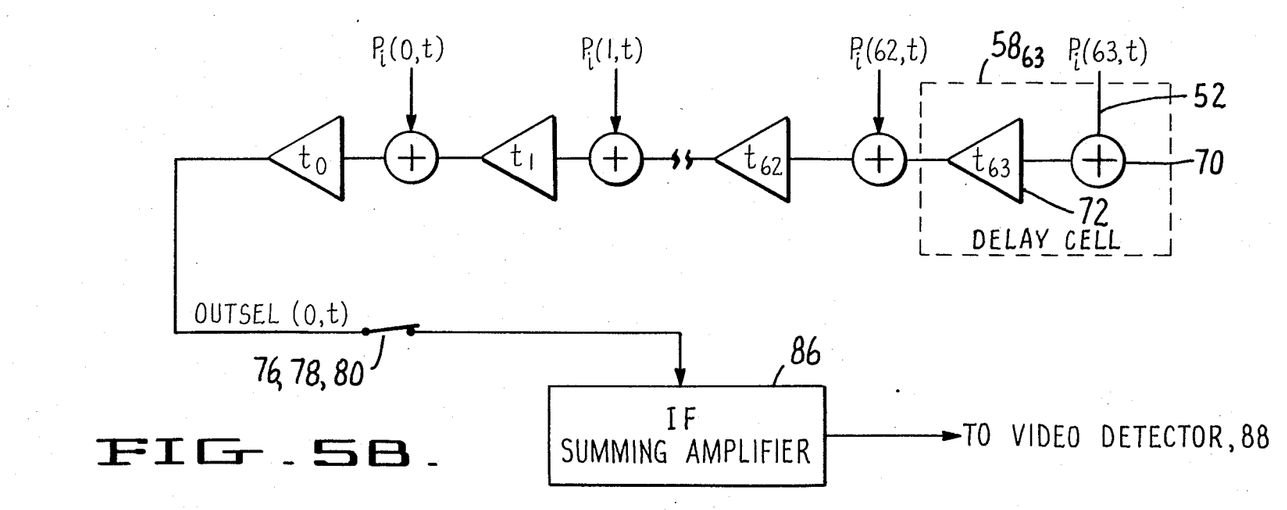

The last example, FIGS. 5a and 5b, shows a delay line configuration for a typical off-axis case, where the steering angle $\theta$ is greater than 15° or so. In such a case, the maximum delay occurs at the end of the array. Therefore, each phased pair starting with 63 merely looks leftward all the way to the first phased pair 0, which is then routed to the IF summing amplifier 86.

The foregoing examples are used to illustrate the delay cell architecture in invention. Many variations are useful and possible which may be apparent to those skilled in the art, such as replacement of delay element 72 with several discrete delay elements in order to obtain smaller quantization values.

One can eliminate outselect summing amplifier means 78, distribution switch means 80, decoupling 90, and inselect summing amplifier 82 and switch means 84 by connecting all the delay cell OUTSEL outputs directly to the IF summing amplifier 86 in a linear scanning mode. A sector scanning mode can be implemented by providing outselect summing amplifier means for the OUTSEL outputs for the outermost delay cells, $58_0$ and $58_{63}$ only. One can also eliminate inselect means entirely from the architecture and still allow scanning in a combined linear/sector mode over the entire array and over all sector angles by adding additional delay cells. The delay line can also operate with inselect means or outselect means or both wherein the cyclic architecture is not used. Other combinations of the number of outselect summing amplifiers with delay cell OUTSEL outputs are also possible with this architecture.

These and other modifications are within the scope of the invention defined in the following claims.

We claim:

1. In an acoustic imaging system having means for repeatedly transmitting an acoustic pressure wave into a body to be examined, an array of transducers for transducing the acoustic echo that impinges on each of them into a corresponding electrical receive signal, one of a plurality of substantially identical channels for processing the receive signal from each transducer and an intermediate frequency summing point for combining, for each scan line, the processed receive signal from each of the transducers in the array, the improvement comprising:
   a summing delay line causing the processed receive signal for each transducer to arrive at the summing point in time overlapped relationship including
   a plurality of delay cells forming the summing delay line in selective sequence, each delay cell consisting of
      (a) delay cell input summing means for at least one of (1) a signal derived from the processed receive signal of at least one transducer, (2) an inselected signal, (3) the output of a first adjacent delay cell or (4) the output of a second adjacent delay cell to produce a delay cell summed input signal,
      (b) delay cell output switch means, and
      (c) at least one discrete delay element connecting the delay cell summed input signal to the delay cell output switch to form a delay cell output, said delay cell output switch selectively connecting the delay cell output to any one of (1) the input summing means of a first adjacent delay cell, or (2) the input summing means of a second adjacent delay cell or (3) an outselection path; and
   a digital control means for coordinating the position of the output switch means for each delay cell to configure the delay line in a preselected manner for each particular scan line of said transducer array.

2. The acoustic imaging system of claim 1 further comprising:
   inselect switch means for connecting an inselected signal to a selected one of said delay cell outputs; and
   wherein the digital control means coordinates the position of the output switch means for each delay cell and said inselect switch means to configure the delay line in a preselected manner for each particular scan line of said transducer array.

3. The acoustic imaging system of claim 1 further comprising:
   outselection distribution switch means for selectively connecting the outselection paths of said delay cells to said summing point; and
   wherein the digital control means coordinates the position of the output switch means for each delay cell and said outselection distribution switch means to configure the delay line in a preselected manner for each particular scan line of said transducer array.

4. The acoustic imaging system of claim 1 further comprising:
   an inselect summing amplifier;
   inselect switch means for connecting an inselected signal of one of said delay cells to an outselected signal at the inselect summing amplifier;
   outselection distribution switch means for selectively connecting the outselection paths of said delay cells to one of said inselect summing amplifier or said summing point or for decoupling it; and
   wherein the digital control means coordinates the position of the output switch means for each delay cell, said inselect switch means and said outselection distribution switch means to configure the delay line in a preselected manner for each particular scan line of said transducer array.

5. The acoustic imaging system of claim 1 wherein the discrete delay may be normal electronic delay or a discrete delay of greater preselected value.

6. The acoustic imaging system of claims 1, 2, 3, 4 or 5 wherein the transducers are arranged in a planar linear array in side-by-side fashion.

7. The acoustic imaging system of claims 1, 3, 4 or 5 wherein each scan line in a linear scan mode is at a predetermined substantially fixed angle to the normal to the transducer array and its position is determined by said digital control means.

8. The acoustic imaging system of claims 1, 2, 4 or 5 wherein each scan line is at an angle with respect to a normal through the transducer array with a common point of intersection, where both the angle and the point of intersection are determined by said digital control means.

9. The acoustic imaging system of claims 1, 2, 3, 4 or 5 wherein each delay cell has more than one discrete delay element and further includes
   delay switch means for selectively connecting the delay cell summed input signal to the delay cell output switch through one or more of the discrete delay elements to form a delay cell output,
   and wherein said digital control means also coordinates the position of the delay switch means for each delay cell.

10. The acoustic imaging system of claims 1, 2, 3, 4 or 5 wherein the digital control means achieves cyclical symmetry among the delay cells by electrically connecting the first and last delay cells in said delay line so as to be indistinguishable from adjacent delay cells.

11. The acoustic imaging system of claims 1, 2, 3, 4 or 5 further including
    phase adjustment means to achieve phase coherence between the receive signals of at least two adjacent transducers to permit coarse quantization of the delay elements in said plurality of delay cells.

12. The acoustic imaging system of claim 11 further including
    heterodyning means in conjunction with the phase adjustment means in order to derive a phased intermediate frequency signal from receive signals of transducer arrays with different operating frequencies.

13. The acoustic imaging system of claim 11 further including
    means for summation of receive signals derived from groups of adjacent transducers to produce a single signal for each transducer group that connects to one delay cell as (1) the signal derived from the processed receive signal of at least one transducer.

14. The acoustic imaging system of claim 12 further including
    means for summation of receive signals derived from groups of adjacent transducers to produce one intermediate frequency signal for each transducer group that connects to one delay cell as (1) the signal derived from the processed receive signal of at least one transducer.

15. The acoustic imaging system of claims 1, 2, 3, 4 or 5 further including
    phase adjustment means to achieve phase coherence between the receive signals of at least two adjacent transducers to permit course quantization of the delay elements in said plurality of delay cells; and
    means to change the phase adjustment in a dynamic fashion during the reception of each acoustic echo in order to maintain phase coherence of transducer receive signals at different depths from the transducer array.

16. The acoustic imaging system of claims 1, 2, 3, 4 or 5 further including
    transmit apodization means to vary the amplitude of each said transmit pulse applied to each transducer from zero to a maximum value for improved sidelobe performance of the transmitted acoustic energy and extension of the depth of focus.

17. The acoustic imaging system of claims 1, 2, 3, 4 or 5 further including
    dynamic receive apodization means to vary the gain of each transducer receive signal from zero to a maximum value to allow the active receive aperture to be small by setting apodization values of outer transducers to zero when said receive signals are from close-in targets, and said aperture to be large when receive signals are from targets farther from the transducer in order to improve the depth of field at all depths from which receive signals are obtained and to improve sidelobe performance by controlling the shape of the active receive aperture.

18. The acoustic imaging system of claims 1, 2, 3, 4 or 5 further including
    digital timing and control means to maintain an approximately constant ratio of receive focal range, which is dynamically variable, to receive aperture size, which is also dynamically variable, over at least a portion of the receive depth to obtain approximately constant lateral resolution over said portion of the receive depth.

19. The acoustic imaging system of claims 1, 2, 3, 4 or 5 further including
    phase adjustment means to achieve phase coherence between the receive signals of at least two adjacent transducers to permit coarse quantization of the delay elements in said plurality of delay cells;
    heterodyning means in conjunction with the phase adjustment means in order to derive a phased intermediate frequency signal from receive signals of transducer arrays with different operating frequencies; and
    means to change the phase adjustment in a dynamic fashion during the reception of each acoustic echo in order to maintain phase coherence of transducer receive signals at different depths from the transducer array.

* * * * *